A. T. HOLTON.
STRAINER.
APPLICATION FILED MAY 20, 1911.
1,028,114.
Patented June 4, 1912.
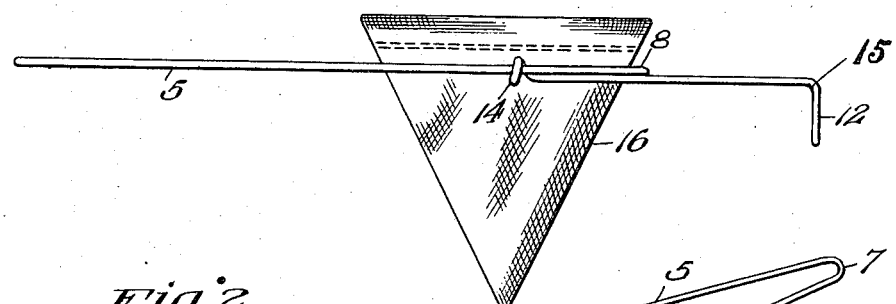
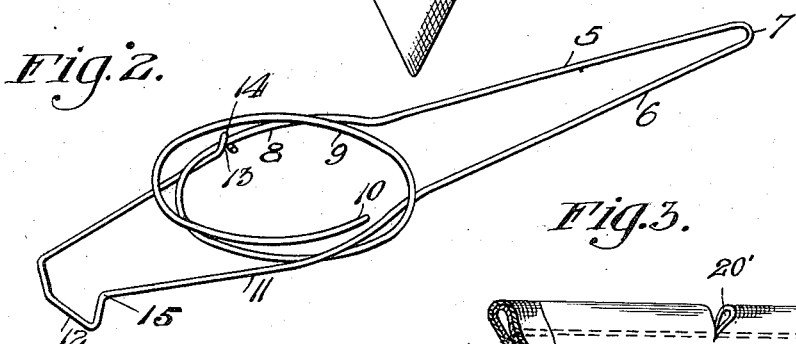
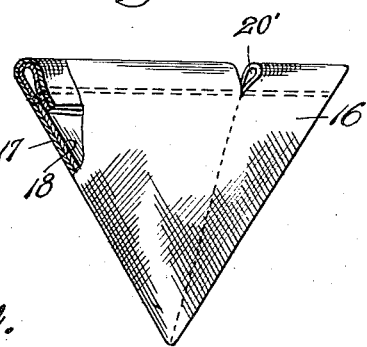
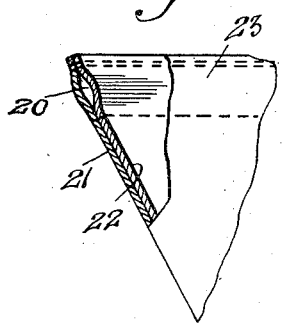
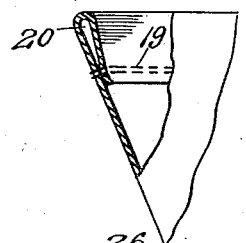
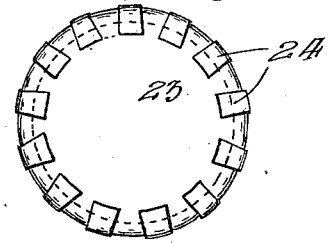
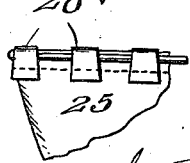
WITNESSES
INVENTOR
Abby T. Holton,
Attorney

UNITED STATES PATENT OFFICE.

ABBY T. HOLTON, OF CONCORD, VERMONT.

STRAINER.

1,028,114.

Specification of Letters Patent.

Patented June 4, 1912.

Application filed May 20, 1911. Serial No. 628,366.

*To all whom it may concern:*

Be it known that I, ABBY T. HOLTON, a citizen of the United States of America, and resident of Concord, in the county of Essex and State of Vermont, have invented certain new and useful Improvements in Strainers, of which the following is a specification.

This invention relates to pails and strainers and particularly to a strainer having detachable straining fabric or material whereby the strainer proper may be applied to and removed from the supporting member in a convenient and ready manner.

An object of this invention is to provide a strainer frame having novel means for supporting strainer material and having novel means for permitting the application of the strainer material to the frame and for removing it therefrom, thus enabling an operator to substitute strainers of different characteristics or those which are adapted to perform certain functions. For instance, it is desirable at times to use straining material of different meshes and in some instances it is desirable to utilize chamois skin where the straining action is to be quite complete as for instance in removing impurities from gasolene and other oils used for combustion engines, therefore the advantage of having the strainer proper readily removable from the frame will, it is thought, be appreciated.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1, illustrates a view in elevation of a strainer embodying invention: Fig. 2 illustrates a perspective view thereof: Fig. 3 illustrates an enlarged detail view: Fig. 4 illustrates a view of a modified form of strainer: and Fig. 5 illustrates a fragment of a still further modification. Fig. 6 illustrates a modified strainer showing means for forming the packet for the supporting device. Fig. 7 illustrates a fastening device somewhat similar to Fig. 6 except that the number of loops is decreased one-half.

In these drawings, I have shown a strainer frame as comprising a strip of metal, preferably wire, having parallel arms 5 and 6 joined by a loop 7, the arm 5 terminating in a portion 8 which is coiled on itself to form a ring 9, the end of said material having its end 10 free of the coiled portion and preferably slightly above the plane of said coiled portion in order that it may be free to receive the strainer to be presently explained. The arm 6 has a continued portion 11 extending through the coiled portion of the arm 5 and projecting beyond the side of the coiled portion opposite to the arms 5 and 6. The continuation 11 of the arm 6 is provided with a loop 12 and the extremity 13 thereof is bent to form a hook 14 by which the extremity is connected to the coiled portion of the arm 5. The loop portion 12 stands at an angle to the portions 11 and 13, thus presenting shoulders 15 which may engage a receptacle to which the strainer is applied for the purpose of preventing dislodgment of the strainer.

The strainer 16 as here shown is tapered toward its lower end and comprises two layers of material 17 and 18 parallel throughout their surfaces in which instance the marginal edge of the double material forming the strainer is turned over on the main portion thereof and secured by two rows of stitching which forms a pocket 20 for the reception of the coiled portion of the strainer supporting device thus enabling the said coiled portion of the strainer supporting device to be threaded in the space or pocket thus formed.

The foregoing is one embodiment of the invention and provides a double thickness of material which may be desirable for certain purposes where slow straining will result in the object to be attained. I may, however, utilize a single piece of material as a strainer as for instance as shown in Fig. 4 in which instance the marginal edge of the material forming the strainer is doubled on the main portion thereof and secured by two rows of stitching 19 so situated with relation to the overturned edge of the material as to form a space between the double stitching and the overturned edge for the reception of the coiled portion of the frame, the said frame being threaded in the space between the stitching and the overturned edge as heretofore described in connection with the disclosure of Figs. 1, 2 and 3. In each instance the strainer is provided with a radial slit 20' providing an opening for the insertion of the coiled portion of the strainer support.

As shown in Fig. 5, the strainer may comprise two layers of comparatively coarse material, said material being numbered 21 and 22 and in this construction, the marginal edges of the two layers are formed into a heading 23 similar to the heading described in connection with the disclosure of the form shown in Fig. 4 and as this will, it is thought, be perfectly apparent and further detailed description of the construction and operation of this form is believed to be unnecessary.

It will be observed from the foregoing description and from an inspection of the drawings that the strainer forming the subject matter of this invention can be made at a very small cost as compared with the metal strainer and that the straining material may be readily removed for the purpose of cleaning the same or for the substitution of straining material differing in mesh from that removed so that with one strainer frame a variety of results may be attained by utilizing a plurality of strainers.

In Fig. 6 the strainer 23 has its upper margin provided with tongues 24 which are alternately looped in opposite directions, and in this form the ring 9 is threaded through the loops by the contiguous tongues, which tongues are stitched to the strainer material.

In Fig. 7 the strainer 25 has a series of separated tongues 26 which are looped to receive the ring 9.

The various ways of forming the ring engaging portions of the strainer is illustrated for the purpose of supporting the statement that the strainer may be variously modified. Likewise the strainers can be made of cloth, chamois skin, felt or other material.

I claim—

In a strainer, a support comprising a continuous strip of metal, bent to form an elongated loop, a coil portion intermediate the length of said loop, said coil portion having a free end, a straining member having its upper portion folded upon itself and sewed to form a pocket, the said pocket adapted to receive the free end of said coil portion.

In testimony whereof I affix my signature in the presence of two witnesses.

ABBY T. HOLTON.

Witnesses:
S. H. BREWER,
F. A. BREWER.